US012790949B2

United States Patent
Gostomelsky et al.

(10) Patent No.: US 12,790,949 B2
(45) Date of Patent: Nov. 10, 2026

(54) LOCKING SPACER ASSEMBLIES AND METHOD FOR INSTALLING A LOCKING SPACER ASSEMBLY

(71) Applicant: Siemens Energy Global GmbH & Co. KG, Munich (DE)

(72) Inventors: Alexander Gostomelsky, Orlando, FL (US); Dimitri Zelmer, Oberhausen (DE); Paul Davis, Stuart, FL (US); Keith Miller, Oviedo, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/848,157

(22) PCT Filed: Mar. 8, 2023

(86) PCT No.: PCT/US2023/014787
§ 371 (c)(1),
(2) Date: Sep. 18, 2024

(87) PCT Pub. No.: WO2023/196077
PCT Pub. Date: Oct. 12, 2023

(65) Prior Publication Data

US 2025/0215802 A1 Jul. 3, 2025

Related U.S. Application Data

(60) Provisional application No. 63/362,695, filed on Apr. 8, 2022.

(51) Int. Cl.
*F01D 5/32* (2006.01)
*F01D 5/30* (2006.01)

(52) U.S. Cl.
CPC ............. *F01D 5/32* (2013.01); *F01D 5/3038* (2013.01); *F05D 2230/51* (2013.01); *F05D 2260/31* (2013.01)

(58) Field of Classification Search
CPC ...... F01D 5/32; F01D 5/3038; F05D 2260/31; F05D 2230/51
See application file for complete search history.

(56) References Cited

U.S. PATENT DOCUMENTS 2,421,855 A * 6/1947 Soderberg ............. F01D 5/3038 416/220 R
3,721,506 A * 3/1973 Anderson ............. F01D 5/3038 411/63

(Continued)

FOREIGN PATENT DOCUMENTS

GB 639320 A * 6/1950 ........... F01D 5/3038
JP S6120924 U 2/1986

(Continued)

OTHER PUBLICATIONS

PCT International Search Report and Written Opinion of International Searching Authority mailed Nov. 27, 2023 corresponding to PCT International Application No. PCT/US2023/014787 filed Mar. 8, 2023.

*Primary Examiner* — Ryan C Clark
(74) *Attorney, Agent, or Firm* — Ye Ren

(57) ABSTRACT

A locking spacer assembly for filling a final spacer slot in a disk groove between platforms of adjacent rotating blades in a gas turbine engine includes a first side piece having a first outer surface, a second side piece having a second outer surface, a mid-piece disposed between and in contact with the first side piece and the second side piece. The mid-piece includes a base and a head. The base has a dovetail shape that engages with the first side piece and the second side piece. The head is flush with the first outer surface and the second outer surface. A fastener is partially disposed within the mid-piece and in contact with a surface of the disk groove.

11 Claims, 7 Drawing Sheets

(56) References Cited

U.S. PATENT DOCUMENTS

| | | | | |
|---|---|---|---|---|
| 6,279,420 | B1 * | 8/2001 | Knorowski | F16F 15/322<br>409/234 |
| 7,435,055 | B2 | 10/2008 | Hansen et al. | |
| 8,157,531 | B2 * | 4/2012 | Krutzfeldt | F01D 5/3038<br>416/216 |
| 8,523,529 | B2 * | 9/2013 | Brittingham | F04D 29/322<br>416/220 R |
| 9,341,071 | B2 * | 5/2016 | Healy | F01D 5/3038 |
| 9,512,732 | B2 * | 12/2016 | Potter | F01D 11/008 |
| 10,519,970 | B2 * | 12/2019 | Montgomery | F01D 5/3023 |
| 2006/0222502 | A1 * | 10/2006 | Hansen | F01D 5/3038<br>416/220 R |
| 2012/0114490 | A1 * | 5/2012 | Joshi | F01D 5/303<br>29/889.21 |
| 2014/0186187 | A1 * | 7/2014 | Lamboy | F02K 3/06<br>29/889.2 |
| 2015/0101348 | A1 * | 4/2015 | Hansen | F01D 5/303<br>416/220 R |
| 2018/0023402 | A1 * | 1/2018 | Sieber | F01D 5/32<br>416/244 A |

FOREIGN PATENT DOCUMENTS

| | | | | | |
|---|---|---|---|---|---|
| WO | 2007077185 | A1 | | 7/2007 | |
| WO | WO-2014025758 | A1 | * | 2/2014 | F01D 5/326 |
| WO | 2016124392 | A1 | | 8/2016 | |
| WO | WO-2019190494 | A1 | * | 10/2019 | F01D 5/32 |
| WO | WO-2019203819 | A1 | * | 10/2019 | F01D 5/32 |

* cited by examiner

LOCKING SPACER ASSEMBLIES AND METHOD FOR INSTALLING A LOCKING SPACER ASSEMBLY

BACKGROUND

A gas turbine engine typically includes a compressor section, a turbine section, and a combustion section disposed therebetween. The compressor section includes multiple stages of rotating compressor blade and stationary compressor vane. The combustion section includes a plurality of combustor. The turbine section includes multiple stages of rotating turbine blade and stationary turbine vane. The rotating compressor blade and the rotating turbine blade are arranged in rows axially spaced apart along a rotor disk and circumferentially attached to a periphery of the rotor disk.

BRIEF SUMMARY

In one aspect, a locking spacer assembly is configured to fill a final spacer slot in a disk groove between platforms of adjacent rotating blades in a gas turbine engine. The locking spacer assembly includes a first side piece that includes a first outer surface, a second side piece that includes a second outer surface, a mid-piece that is disposed between and in contact with the first side piece and the second side piece. The mid-piece includes a base and a head. The base has a dovetail shape that engages with the first side piece and the second side piece in an assembled arrangement. The head is flush with the first outer surface and the second outer surface in the assembled arrangement. A fastener is partially disposed within the mid-piece and in contact with a surface of the disk groove. The fastener is operable to move the mid-piece, the first side piece, and the second side piece to the assembled arrangement.

In one aspect, a locking spacer assembly is configured to fill a final spacer slot in a disk groove between platforms of adjacent rotating blades in a gas turbine engine. The locking spacer assembly includes a first side piece that includes a first outer surface and a first recess formed inward of the first outer surface, a second side piece that includes a second outer surface and a second recess formed inward of the second outer surface, a mid-piece that includes a base, a head, and a mid-body between the base and the head. The mid-piece, the first side piece, and the second side piece are movable between a pre-assembled arrangement in which the head is partially disposed into the first recess and the second recess and is completely below the first outer surface and the second outer surface and an assembled arrangement in which the head is flush with the first outer surface and the second outer surface. A fastener is partially disposed within the mid-piece and operable to move the mid-piece, the first side piece, and the second side piece between the pre-assembled arrangement and the assembled arrangement.

In one aspect, a method installs a locking spacer assembly into a final spacer slot in a disk groove between platforms of adjacent rotating blades in a gas turbine engine. The method includes holding a mid-piece between and in contact with a first side piece and a second side piece by positioning a head of the mid-piece partially into a first recess of the first side piece and a second recess of the second side piece defining a pre-assembled arrangement of the locking spacer assembly, placing the mid-piece, the first side piece, and the second side piece in the pre-assembled arrangement into the final spacer slot, moving the first side piece and the second side piece away from the mid-piece, engaging a fastener with the mid-piece, rotating the fastener to engage with a surface of the disk groove, further rotating the fastener to move the mid-piece away from the surface of the disk groove, and ceasing rotation of the fastener when a head of the mid-piece moves to a position where it is flush with a first outer surface of the first side piece and a second outer surface of the second side piece.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
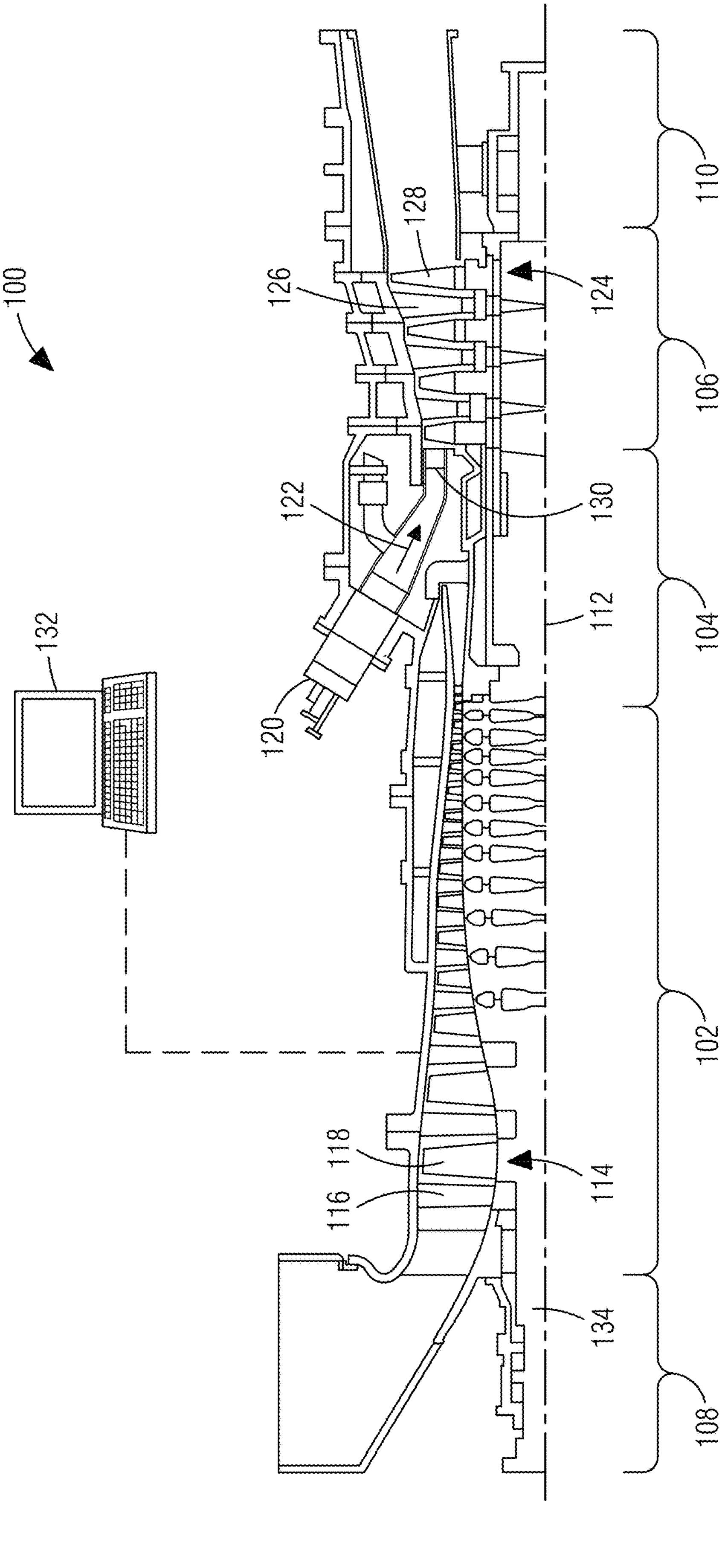
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including", "having", and "comprising", as well as derivatives thereof, mean inclusion without limitation. The singular forms "a", "an", and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith" as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

Also, in the description, the terms "axial" or "axially" refer to a direction along a longitudinal axis of a gas turbine engine. The terms "radial" or "radially" refer to a direction perpendicular to the longitudinal axis of the gas turbine engine. The terms "downstream" or "aft" refer to a direction along a flow direction. The terms "upstream" or "forward" refer to a direction against the flow direction.

In addition, the term "adjacent to" may mean that an element is relatively near to but not in contact with a further element, or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of stationary compressor vanes 116 or adjustable guide vanes and a set of rotating compressor blades 118. A rotor 134 supports the rotating compressor blades 118 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustor 120 that each operates to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of stationary turbine vanes 126 and a number of rotating turbine blades 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other devices to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions, the control system 132 is typically micro-processor based and includes memory devices and data storage devices for collecting, analyzing, and storing data. In addition, the control system 132 provides output data to various devices including monitors, printers, indicators, and the like which allow users to interface with the control system 132 to provide inputs or adjustments. In the example of a power generation system, a user may input a power output setpoint and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature, and pressure, combustor outlet temperature, fuel flow rate, generator power output, bearing temperature, and the like. Many of these measurements are displayed for the user and are logged for later review should such a review be necessary.

Figure 2:
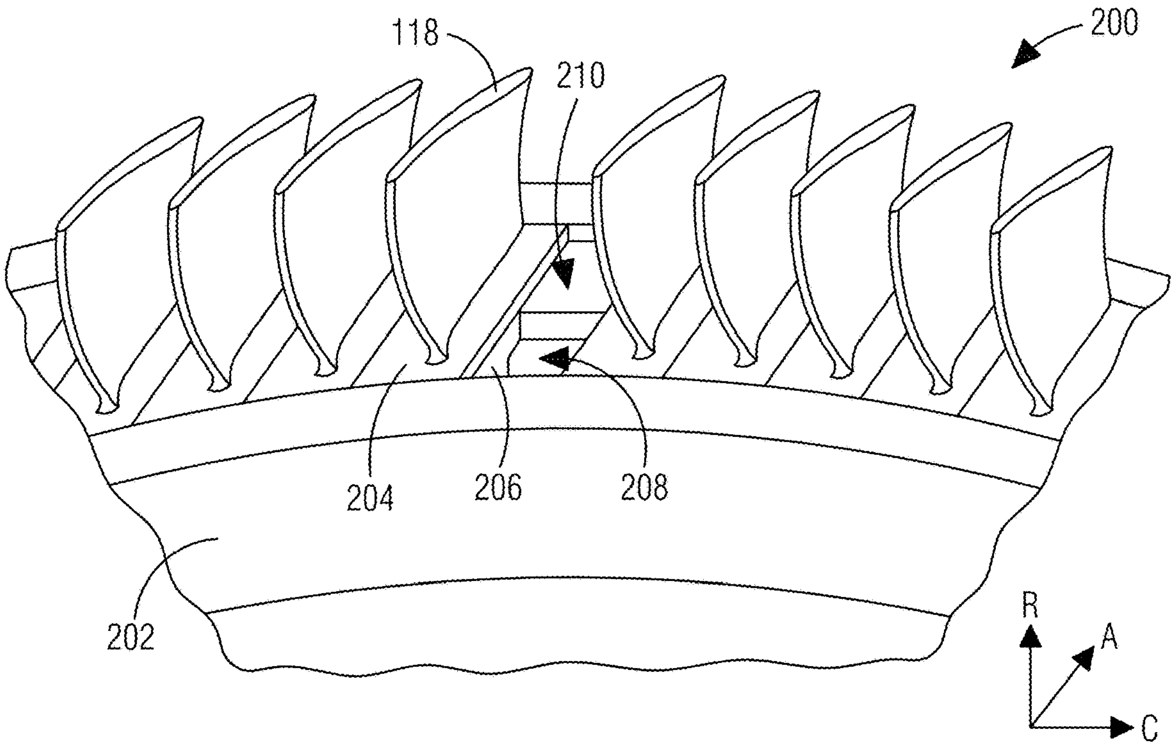
FIG. 2 is a perspective view of a portion of a blade assembly showing a final spacer slot of a disk groove, the blade assembly being used with the gas turbine engine in FIG. 1.

FIG. 2 illustrates a perspective view of a portion of a blade assembly 200. The blade assembly 200 may be used with the gas turbine engine 100 in FIG. 1. The blade assembly 200 is arranged in a way to define an axial direction A, a circumferential direction C, and a radial direction R, as illustrated in FIG. 2. The blade assembly 200 includes a plurality of rotating compressor blades 118 that are attached to a rotor disk 202. Each rotating compressor blade 118 includes a platform 204 and a root 206 that extends inward from the platform 204 in a radial direction R of the gas turbine engine 100. While FIG. 2 illustrates a plurality of rotating compressor blades 118, other constructions can be applied to any rotating blades, such as rotating turbine blades 128.

The rotor disk 202 may be formed as a part of the rotor 134 or may be a separate part that is attached to the rotor 134. The rotor disk 202 defines a disk groove 208 for engaging the roots 206 of the rotating compressor blades 118. The rotating compressor blades 118 are inserted into the disk groove 208 one at a time during assembly. The platform 204 extends in the disk groove 208 along an axial direction A of the gas turbine engine 100. Once all the rotating compressor blades 118 are assembled in the disk groove 208, a final spacer slot 210 is defined in the disk groove 208 between the platform 204 of the rotating compressor blade 118 that is first installed and the platform 204 of the rotating compressor blade 118 that is last installed.

Figure 3:
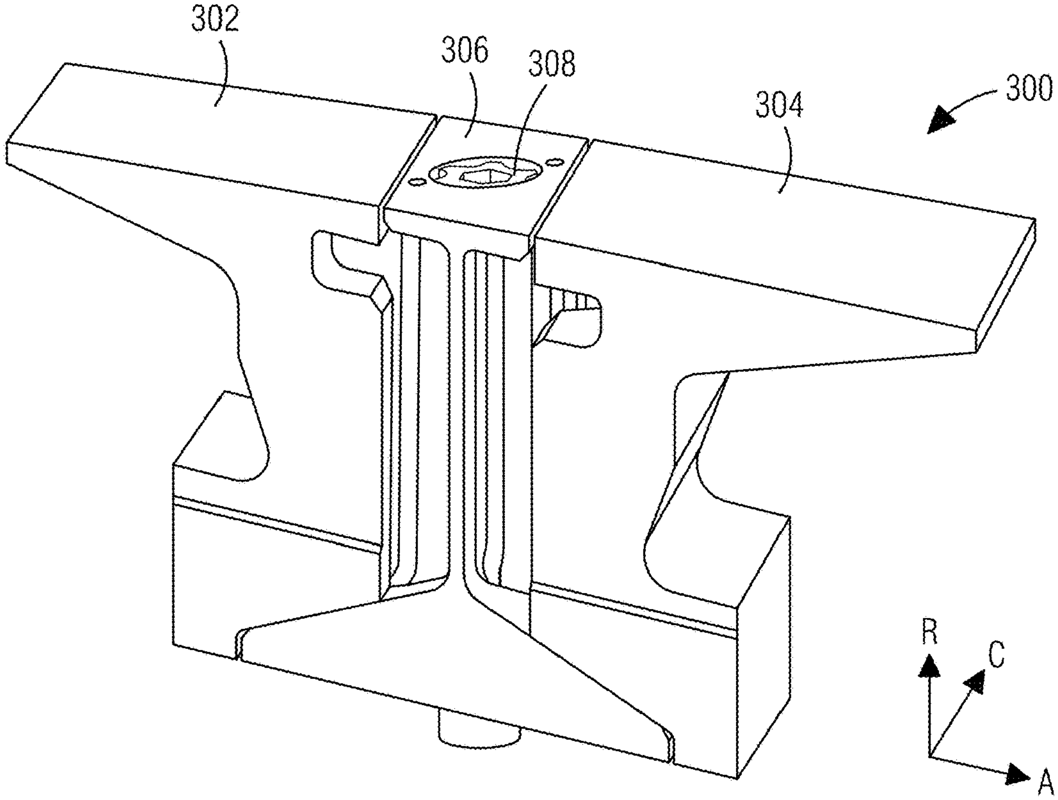
FIG. 3 is a perspective view of a locking spacer assembly to fill out the final spacer slot in FIG. 2.

FIG. 3 illustrates a perspective view of a locking spacer assembly 300 in an assembled arrangement. The locking spacer assembly 300 is used to fill the final spacer slot 210 and to lock the rotating compressor blades 118 in the circumferential direction C.

The locking spacer assembly 300 includes a first side piece 302, a second side piece 304, a mid-piece 306 disposed between the first side piece 302 and the second side piece 304, and a fastener 308 that is partially disposed within the mid-piece 306. The fastener 308 may include a screw, such as a set screw. The first side piece 302 may be positioned at a forward side with respect to the axial direction A. The second side piece 304 may be positioned at a rear side with respect to the axial direction A.

Figure 4:
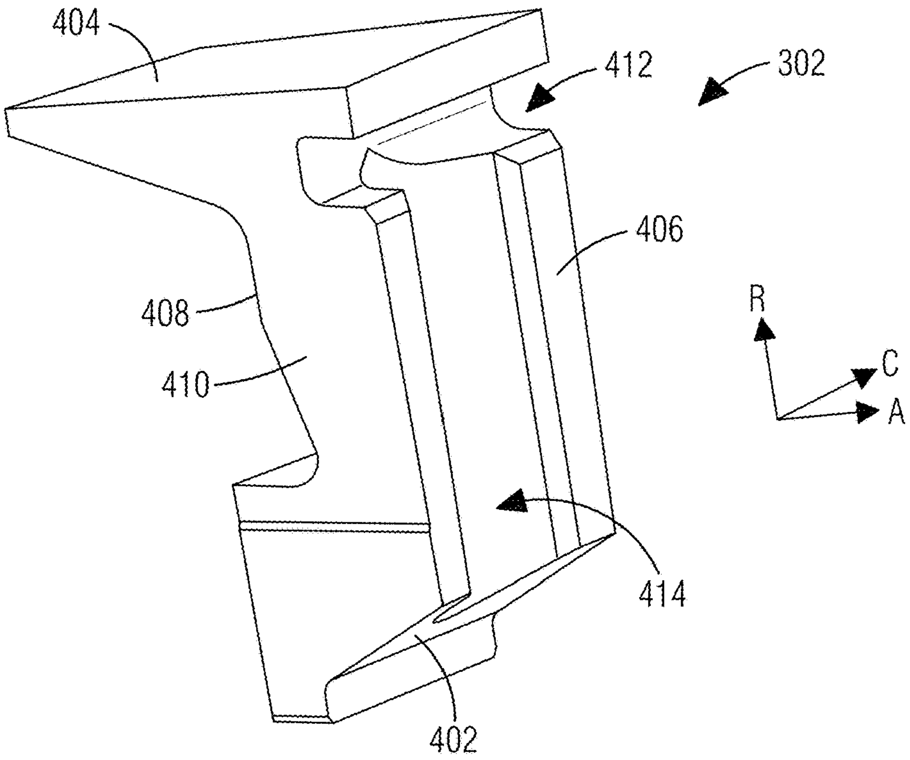
FIG. 4 is a perspective view of a first side piece of the locking spacer assembly in FIG. 3.

FIG. 4 illustrates a perspective view of the first side piece 302 of the locking spacer assembly 300. The first side piece 302 includes a first inner surface 402, a first outer surface 404, a first inner side surface 406, a first outer side surface 408, and a first body 410. The first inner surface 402 has a generally rectangular shape and is located at the radially innermost position of the first side piece 302 when the first side piece 302 is in an installed position. The first inner surface 402 is obliquely angled with respect to the radial direction R. The first outer surface 404 has a generally rectangular shape and is located at the radially outermost position of the first side piece 302 when the first side piece 302 is in the installed position. The first inner side surface 406 has a generally rectangular shape and is located at the axial inner side when the first side piece 302 is in the installed position. The first outer side surface 408 is generally C-shaped and is located at the axial outer side when the first side piece 302 is in the installed position. The first body 410 is disposed between the first inner surface 402 and the first outer surface 404. Other orientations or shapes of the first inner surface 402, the first outer surface 404, the first inner side surface 406, and the first outer side surface 408 are also possible.

The first side piece 302 defines a first recess 412 in the first body 410. The first recess 412 is formed directly inward of the first outer surface 404. The first recess 412 may also be formed at any location between the first outer surface 404 and the first inner surface 402. The first recess 412 extends inward from the first inner side surface 406 toward the first outer side surface 408. The first recess 412 extends axially across the first body 410. The first recess 412 is formed at a radial position that is closer to the first outer surface 404 than to the first inner surface 402. The first recess 412 has a generally rectangular shape. Other shapes of the first recess 412 are also possible.

The first side piece 302 defines a first groove 414 that extends from the first inner surface 402 toward the first outer surface 404. The first groove 414 is defined in the first body 410 and inward of the first outer surface 404. The first groove 414 has an opening at the first inner side surface 406. The first groove 414 has a generally cylindrical shape. Other shapes of the first groove 414 are also possible.

Figure 5:
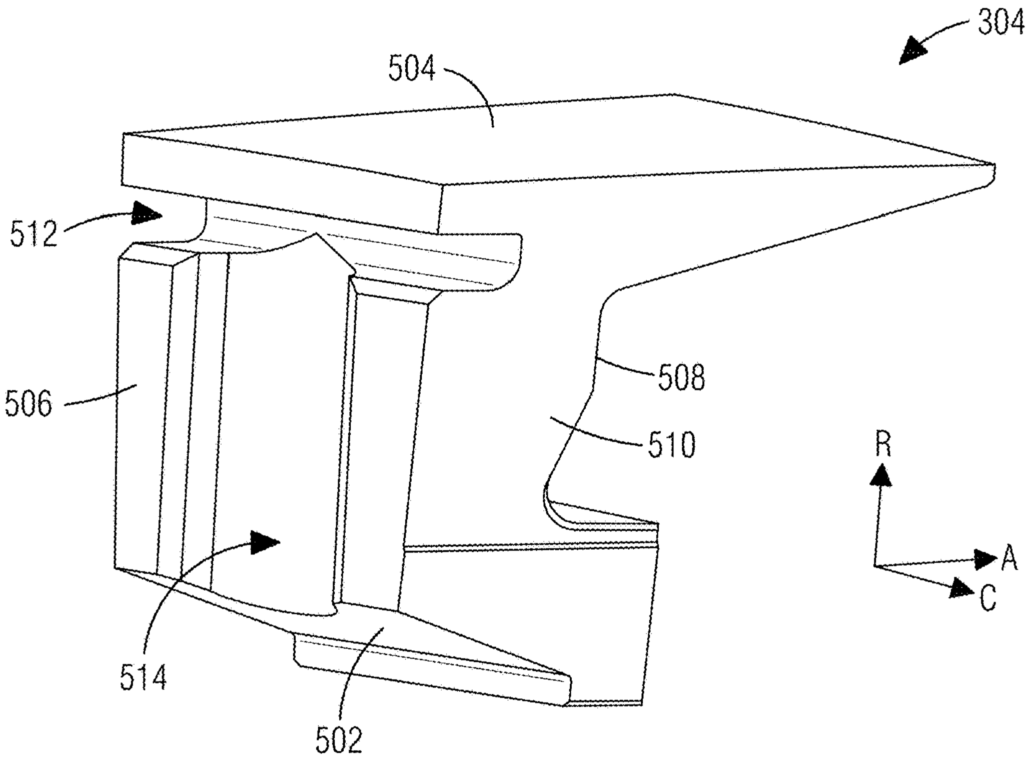
FIG. 5 is a perspective view of a second side piece of the locking spacer assembly in FIG. 3.

FIG. 5 illustrates a perspective view of the second side piece 304 of the locking spacer assembly 300. The second side piece 304 is substantially similar to the first side piece 302.

The second side piece 304 includes a second inner surface 502 at the radially innermost position, a second outer surface 504 at the radially outermost position, a second inner side surface 506 at the axial inner side, a second outer side surface 508 at the axial outer side, and a second body 510 disposed between the second inner surface 502 and the second outer surface 504. The second inner surface 502 has a generally rectangular shape. The second inner surface 502 is obliquely angled with respect to the radial direction R. The second outer surface 504 has a generally rectangular shape. The second inner side surface 506 has a generally rectangular shape. The second outer side surface 508 is generally C-shaped. Other orientations or shapes of the second inner surface 502, the second outer surface 504, the second inner side surface 506, and the second outer side surface 508 are also possible.

The second side piece 304 defines a second recess 512 in the second body 510. The second recess 512 is formed inward of the second outer surface 504. The second recess 512 may be formed directly inward of the second outer surface 504. The second outer surface 504 extends inward from the second inner side surface 506 toward the second outer side surface 508. The second outer surface 504 extends transversely across the second body 510. The second recess 512 is formed at a radial position that is closer to the second outer surface 504 than to the second inner surface 502. The second groove second recess 512 has a generally rectangular shape. Other shapes of the second recess 512 are also possible.

The second side piece 304 defines a second groove 514 that extends from the second inner surface 502 toward the second outer surface 504. The second groove 514 is defined in the second body 510 and inward of the second outer surface 504. The second groove 514 has an opening at the second inner side surface 506. The second groove 514 has a generally cylindrical shape. Other shapes of the second groove 514 are also possible.

Figure 6:
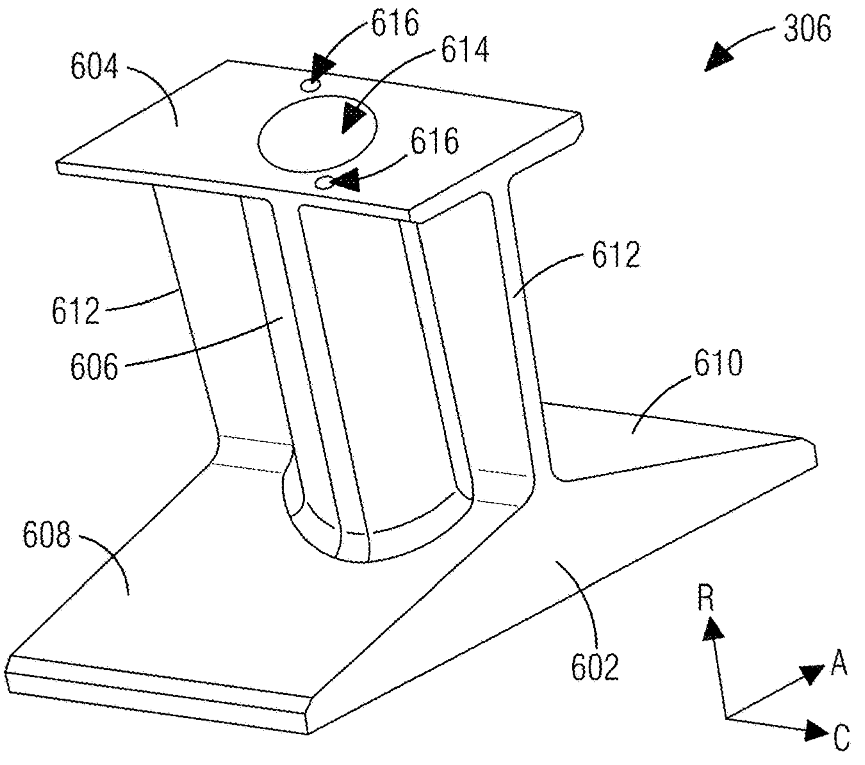
FIG. 6 is a perspective view of a mid-piece of the locking spacer assembly in FIG. 3.

FIG. 6 illustrates a perspective view of the mid-piece 306 of the locking spacer assembly 300. The mid-piece 306 includes a base 602 at the radially innermost position, a head 604 at the radially outermost position, and a mid-body 606 disposed between the base 602 and the head 604. The base 602 has a dovetail shape defined by a first surface 608 and a second surface 610 that are each obliquely angled with respect to the radial direction R. The first surface 608 and the second surface 610 extend from two opposite sides of the mid-body 606 in the axial direction A and downwardly in the radial direction R. The first surface 608 and the second surface 610 cooperate to define the dovetail shape. The head 604 has a generally rectangular shape. Other orientations or shapes of the 602 and the head 604 are also possible.

The mid-piece 306 includes a strip plate 612 disposed between the base 602 and the head 604. The strip plate 612 is coupled to the mid-body 606 and extends from two opposite sides of the mid-body 606. The strip plate 612 is disposed between the first surface 608 and the second surface 610.

Figure 11:
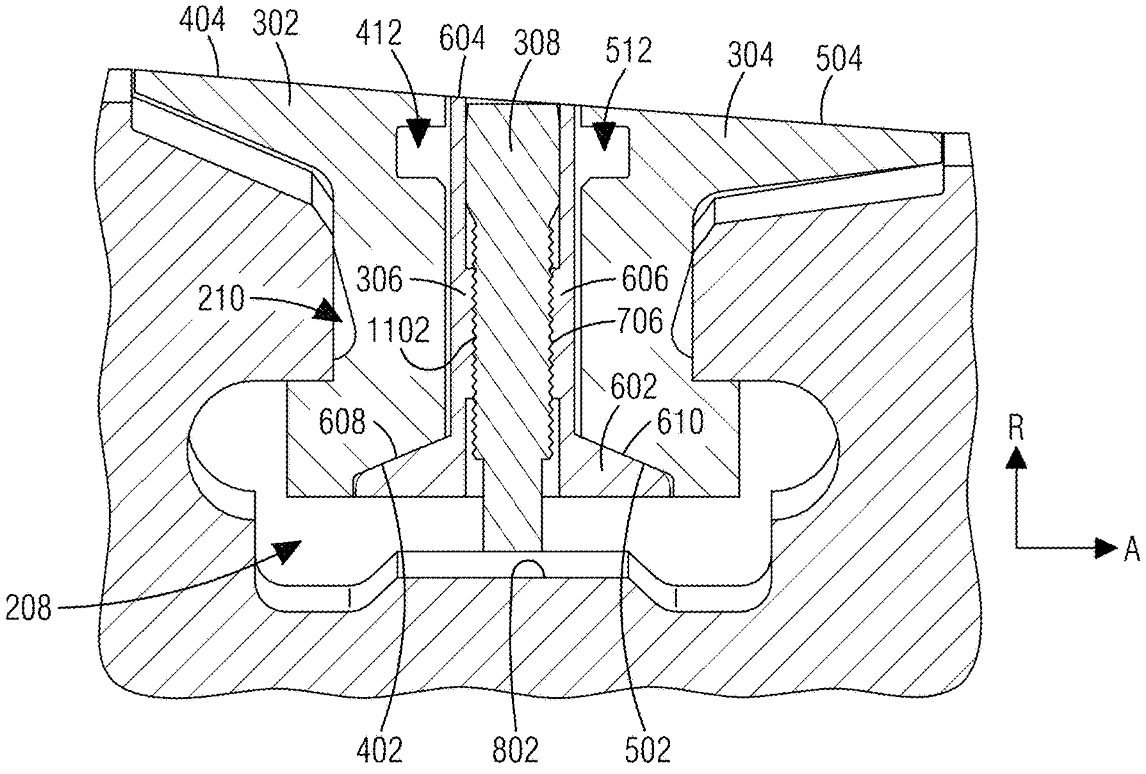
FIG. 11 is a cross-section view of the locking spacer assembly in FIG. 3 in an assembled arrangement installed in the final spacer slot in FIG. 2.

The mid-piece 306 defines a hollow inside 614 that passes through the base 602, the mid-body 606, and the head 604. The hollow inside 614 incudes a threaded surface 1102 which is shown in FIG. 11. The mid-body 606 has a generally cylindrical shape with other shapes being possible.

The mid-piece 306 has two staking dents 616 defined on the head 604. The two staking dents 616 are disposed on two opposite sides of an edge of the hollow inside 614 that intersects the head 604 with other locations and quantities being possible.

Figure 7:
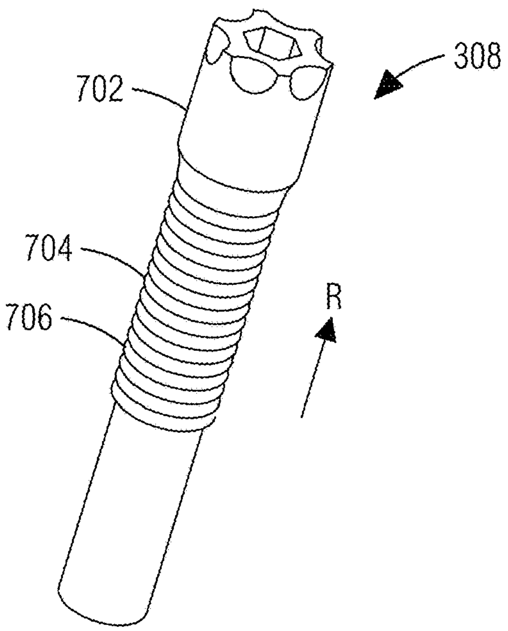
FIG. 7 is a perspective view of a fastener of the locking spacer assembly in FIG. 3.

FIG. 7 illustrates a perspective view of a fastener 308 of the locking spacer assembly 300. The fastener 308 includes a fastener head 702 at the radially outermost position and a fastener body 704 that extends from the fastener head 702. The fastener head 702 includes a plurality of dents to be engaged with a fastener tool. The fastener body 704 has a generally cylindrical shape. The fastener body 704 has a threaded portion 706 that corresponds to the threaded surface 1102 of the mid-piece 306 to allow threadable engagement. The fastener body 704 may have several portions having different diameters. Other orientations or shapes of the fasteners 308 are also possible.

Figure 8:
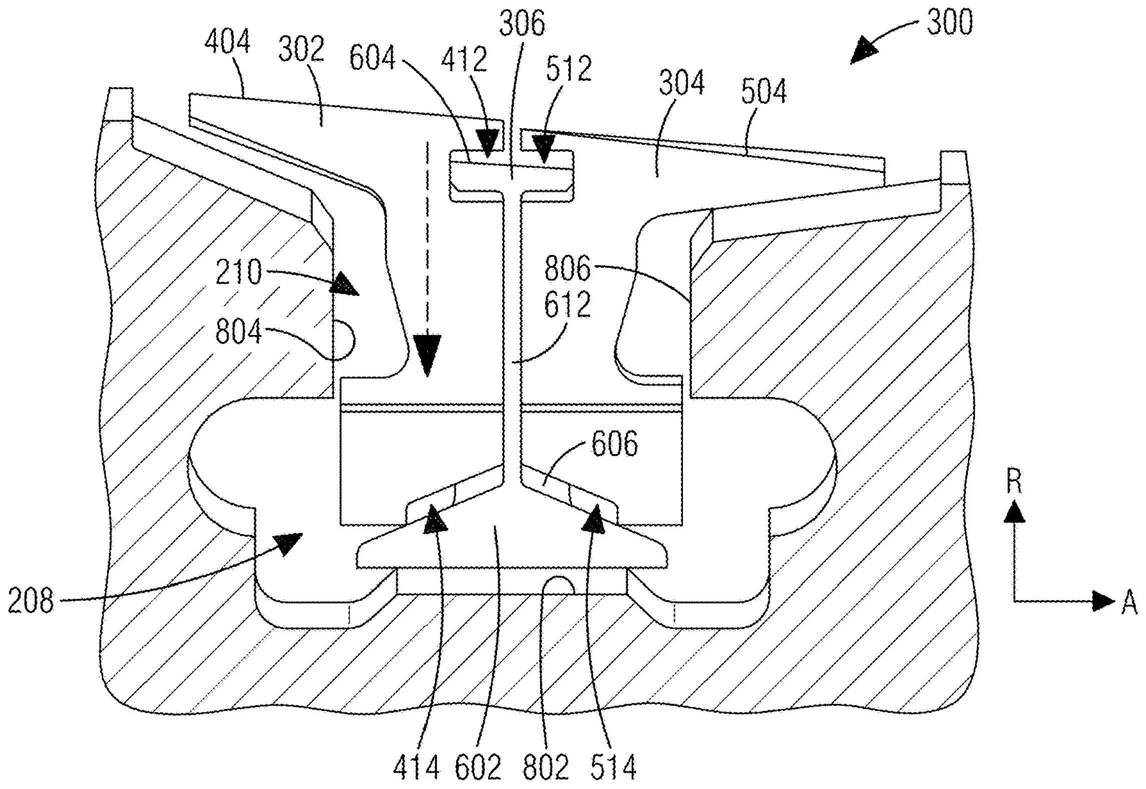
FIG. 8 is a cross-section view of the final spacer slot in FIG. 2 to illustrate a step to install the locking spacer assembly in FIG. 3 into the final spacer slot.

FIG. 8 illustrates a cross-section view of the final spacer slot 210 to illustrate a step to install the locking spacer assembly 300 into the final spacer slot 210. The disk groove 208 includes a surface 802 at the radially innermost position, a first side surface 804, and a second side surface 806 that is opposite to the first side surface 804. An arrangement of the first side piece 302, the second side piece 304, and the mid-piece 306 in this step defines a pre-assembled arrangement. In the pre-assembled arrangement, the mid-piece 306 is held between and in contact with the first side piece 302 and the second side piece 304. The head 604 of the mid-piece 306 is partially disposed within the first recess 412 and the second recess 512 to hold the mid-piece 306. The head 604 is completely below the first outer surface 404 and the second outer surface 504 in the pre-assembled arrangement. The mid-body 606 is disposed within the first groove 414 of the first side piece 302 and the second groove 514 of the second side piece 304. The strip plate 612 of the mid-piece 306 is disposed between the first side piece 302 and the second side piece 304. The first side piece 302, the second side piece 304, and the mid-piece 306 in the pre-assembled arrangement are placed into the final spacer slot 210 of the disk groove 208 where the base 602 of the mid-piece 306 may rest on the surface 802 of the disk groove 208.

Figure 9:
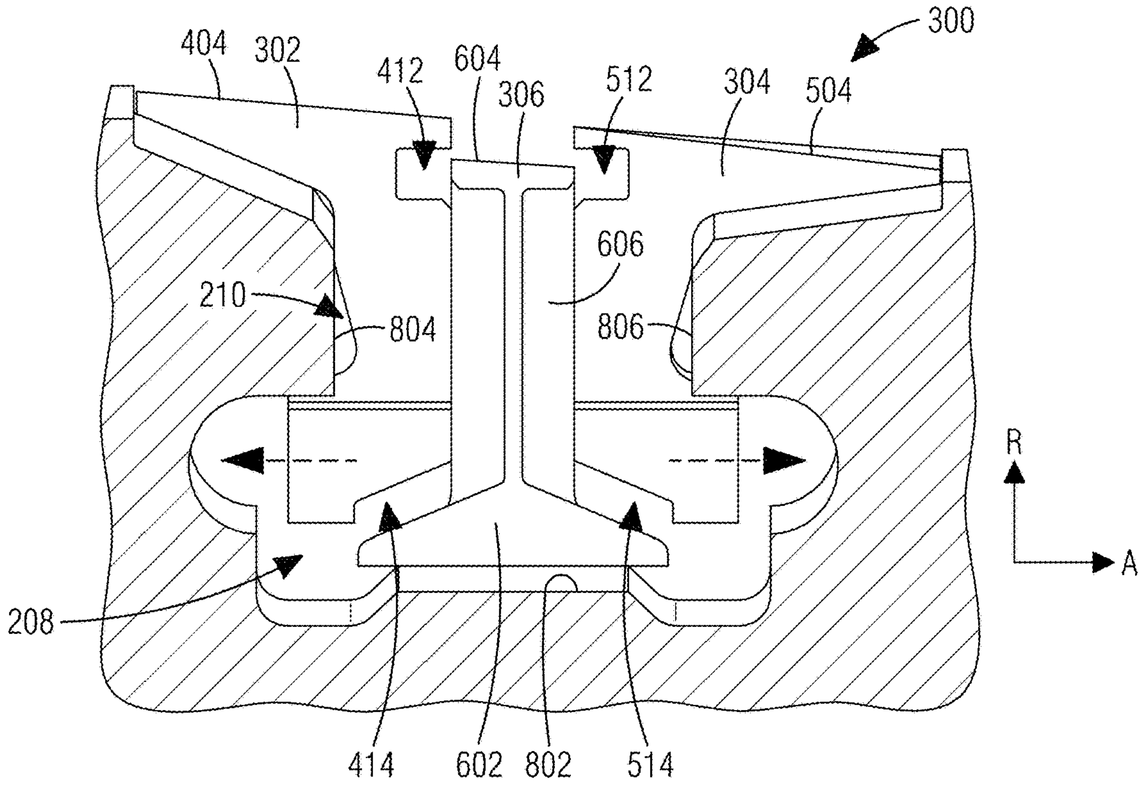
FIG. 9 is a cross-section view of the final spacer slot in FIG. 2 to illustrate a further step to install the locking spacer assembly in FIG. 3 into the final spacer slot.

FIG. 9 illustrates a cross-section view of the final spacer slot 210 to illustrate a further step to install the locking spacer assembly 300 into the final spacer slot 210. An arrangement of the first side piece 302, the second side piece 304, and the mid-piece 306 in this further step defines a first transient assembled arrangement. In the first transient assembled arrangement, the first side piece 302 is moved away from the mid-piece 306 toward the first side surface 804 of the disk groove 208. The second side piece 304 is moved away from the mid-piece 306 toward the second side surface 806 of the disk groove 208. The mid-body 606 of the mid-piece 306 is positioned between the first side piece 302 and the second side piece 304. The mid-body 606 is positioned partially out of the first groove 414 and the second groove 514. The head 604 is completely below the first outer surface 404 and the second outer surface 504. The first side piece 302 and the second side piece 304 may be axially moved simultaneously or one after the other.

Figure 10:
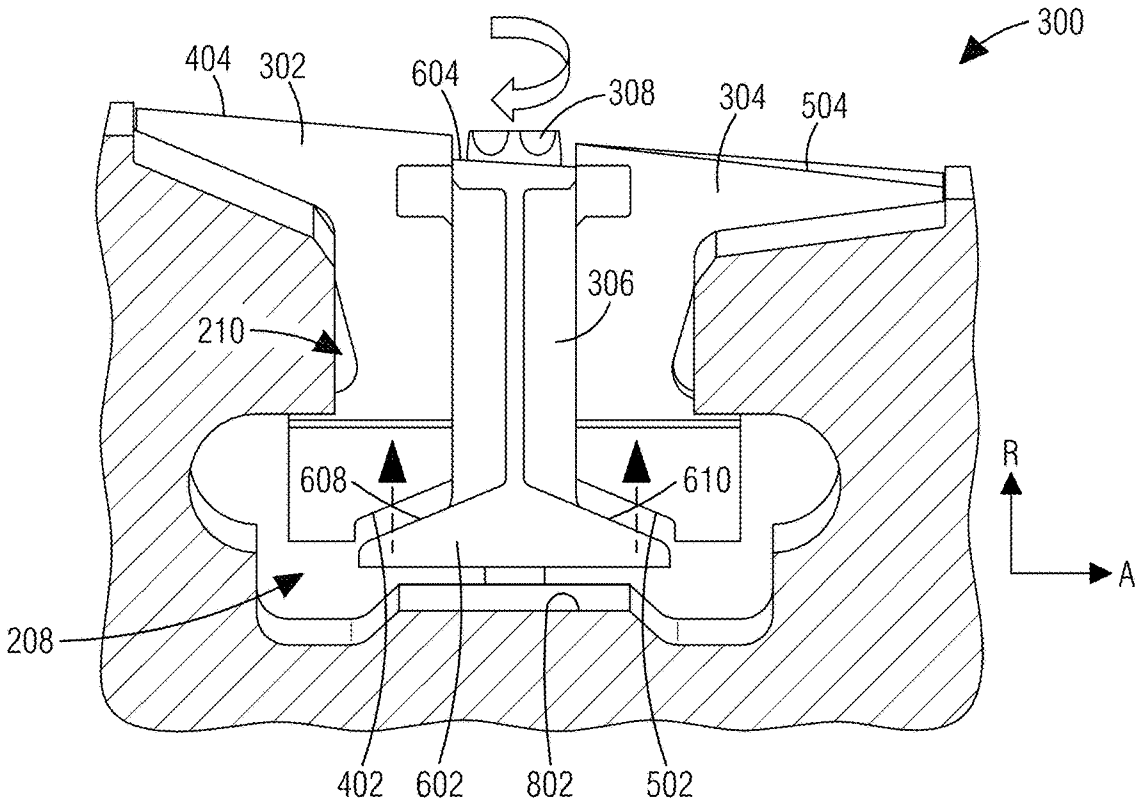
FIG. 10 is a cross-section view of the final spacer slot in FIG. 2 to illustrate a yet further step to install the locking spacer assembly in FIG. 3 into the final spacer slot.

FIG. 10 illustrates a cross-section view of the final spacer slot 210 to l=illustrate a yet further step to install the locking spacer assembly 300 into the final spacer slot 210. An arrangement of the first side piece 302, the second side piece 304, the mid-piece 306, and the fastener 308 in this yet further step define a second transient assembled arrangement. In the second transient assembled arrangement, the fastener 308 is partially disposed within the mid-piece 306. The fastener 308 is placed into the hollow inside 614 of the mid-piece 306. The fastener 308 is rotated to engage the threaded portion 706 with the threaded surface 1102 of the mid-piece 306 and position an end of the fastener 308 in contact with the surface 802 of the disk groove 208. The fastener 308 is further rotated to move the mid-piece 306 away from the surface 802 of the disk groove 208. The first surface 608 and the second surface 610 of the mid-piece 306 are moved into engagement with the first inner surface 402 of the first side piece 302 and the second inner surface 502 of the second side piece 304. The first side piece 302 and the second side piece 304 move in response to the movement of the mid-piece 306. The rotation of the fastener 308 is stopped when the head 604 of the mid-piece 306 moves to a position where the head 604 is flush with the first outer surface 404 and the second outer surface 504.

FIG. 11 illustrates a cross-section view of the locking spacer assembly 300 in an assembled arrangement installed in the final spacer slot 210. In the assembled arrangement, also with reference to FIG. 3, the head 604 of the mid-piece 306 is flush with the first outer surface 404 and the second outer surface 504 defining a flat flow path. A first clearance may exist between the first outer surface 404 and the head 604. A second clearance may exist between the second outer surface 504 and the head 604. The mid-body 606 of the mid-piece 306 is positioned between the first side piece 302 and the second side piece 304. The mid-body 606 is positioned partially out of the first groove 414 and the second groove 514. The first surface 608 of the mid-piece 306 engages with the first inner surface 402. The second surface 610 of the base 602 engages with the second inner surface 502. The fastener 308 is partially disposed within the mid-piece 306. The fastener 308 is in contact with and rests on the surface 802 of the disk groove 208. At least part of the threaded portion 706 of the fastener 308 is engaged with the threaded surface 1102 of the mid-piece 306. The first side piece 302, the second side piece 304, and the mid-piece 306 are positioned in place in the final spacer slot 210 of the disk groove 208 by the fastener 308. The fastener 308 is secured in the mid-piece 306 by staking using the staking dents 616. The final spacer slot 210 of the disk groove 208 is filled out by the locking spacer assembly 300. The rotating compressor blades 118 are locked in the disk groove 208.

Figure 12:
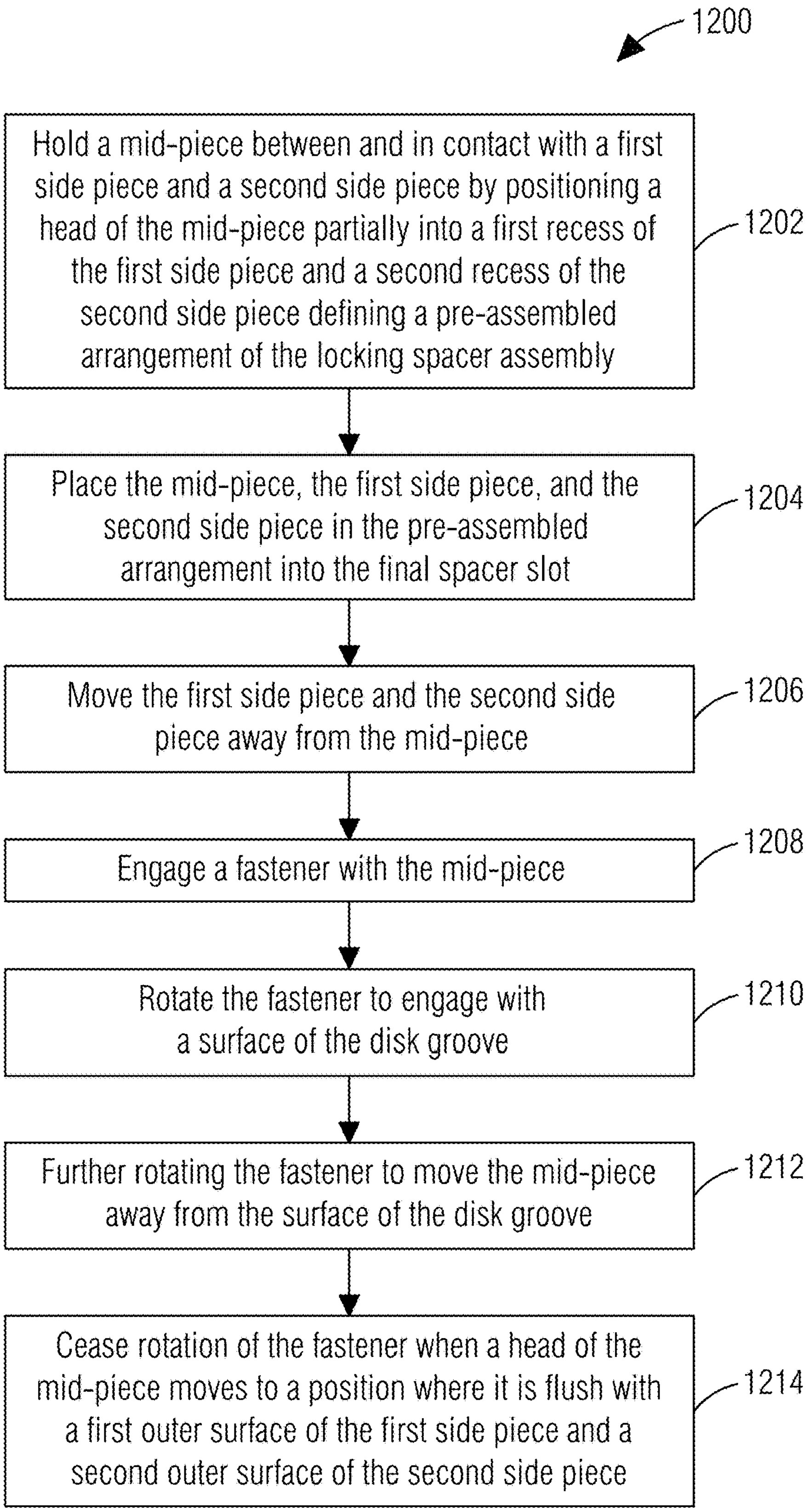
FIG. 12 is a method of assembly to install the locking spacer assembly in FIG. 3 into the final spacer slot in FIG. 2.

FIG. 12 is a method of assembly 1200 to install the locking spacer assembly 300 into the final spacer slot 210 as illustrated in FIG. 8 through FIG. 11. In a block 1202, the mid-piece 306 is held between and in contact with the first side piece 302 and the second side piece 304 by positioning the head 604 of the mid-piece 306 partially into the first recess 412 of the first side piece 302 and the second recess 512 of the second side piece 304 that defines the pre-assembled arrangement of the locking spacer assembly 300. In a block 1204, the mid-piece 306, the first side piece 302, and the second side piece 304 in the pre-assembled arrangement are placed into the final spacer slot 210. In the block 1206, the first side piece 302 and the second side piece 304 are moved away from the mid-piece 306. In a block 1208, the fastener 308 is engaged with the mid-piece 306. In a block 1210, the fastener 308 is rotated to engage with the surface 802 of the disk groove 208. In a block 1212, the fastener 308 is further rotated to move the mid-piece 306 away from the surface 802 of the disk groove 208. In a block 1214, the rotation of the fastener 308 is stopped when the head 604 of the mid-piece 306 moves to a position where it is flush with the first outer surface 404 of the first side piece 302 and the second outer surface 504 of the second side piece 304.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the descriptions in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

LISTING OF DRAWING ELEMENTS

100: gas turbine engine
102: compressor section
104: combustion section
106: turbine section
108: inlet section
110: exhaust portion
112: central axis
114: compressor stage
116: stationary compressor vane
118: rotating compressor blade
120: combustor
122: exhaust gas
124: turbine stage
126: stationary turbine vane
128: rotating turbine blade
130: turbine inlet
132: control system
134: rotor
200: blade assembly
202: rotor disk
204: platform
206: root
208: disk groove
210: final spacer slot
300: locking spacer assembly
302: first side piece
304: second side piece
306: mid-piece
308: fastener
402: first inner surface
404: first outer surface
406: first inner side surface
408: first outer side surface
410: first body
412: first recess
414: first groove
502: second inner surface
504: second outer surface
506: second inner side surface
508: second outer side surface
510: second body
512: second recess
514: second groove
602: base
604: head
606: mid-body
608: first surface
610: second surface
612: strip plate
614: hollow inside
616: staking dents
702: fastener head
704: fastener body
706: threaded portion
802: surface
804: first side surface
806: second side surface
1102: threaded surface
1200: method of assembly

What is claimed is:

1. A locking spacer assembly configured to fill a final spacer slot in a disk groove between platforms of adjacent rotating blades in a gas turbine engine, the locking spacer comprising:

a first side piece comprising a first outer surface and a first inner side surface and a first recess formed in the first inner side surface and disposed completely inward of the first outer surface;

a second side piece comprising a second outer surface and a second inner side surface and a second recess formed in the second inner side surface and disposed completely inward of the second outer surface;

a mid-piece comprising a base, a head, and a mid-body between the base and the head, the mid-piece, the first side piece, and the second side piece movable between a pre-assembled arrangement in which the head is partially disposed into the first recess and the second recess and is completely below the first outer surface and the second outer surface and an assembled arrangement in which the head is flush with the first outer surface and the second outer surface; and a fastener partially disposed within the mid-piece and operable to move the mid-piece, the first side piece, and the second side piece between the pre-assembled arrangement and the assembled arrangement, wherein the first side piece comprises a first inner surface and a first groove that extends from the first inner surface to the first recess, wherein the second side piece comprises a second inner surface and a second groove that extends from the second inner surface to the second recess, wherein the mid-body is disposed within the first groove and the second groove in the pre-assembled arrangement, and wherein the first inner surface and the second inner surface contact the base in the assembled arrangement.

2. The locking spacer assembly of claim 1, wherein the mid-piece defines a hollow inside that passes through the base, the mid-body, and the head, and wherein the fastener is partially disposed within the hollow inside.

3. The locking spacer assembly of claim 1, wherein the base has a dovetail shape comprising a first surface that is angled with respect to a radial direction and a second surface that is angled with respect to the radial direction.

4. The locking spacer assembly of claim 3, wherein the first inner surface is angled with respect to the radial direction, wherein the second inner surface is angled with respect to the radial direction, wherein the first inner surface engages with the first surface in the assembled arrangement, and wherein the second inner surface engages with the second surface in the assembled arrangement.

5. The locking spacer assembly of claim 1, wherein the mid-piece comprises a strip plate that is coupled to the mid-body and extends between the base and the head.

6. The locking spacer assembly of claim 1, wherein the fastener engages with a surface of the disk groove in the assembled arrangement.

7. The locking spacer assembly of claim 1, wherein the head of the mid-piece defines two staking dents.

8. A method for installing a locking spacer assembly into a final spacer slot in a disk groove between platforms of adjacent rotating blades in a gas turbine engine, the method comprising:

holding a mid-piece between and in contact with a first side piece and a second side piece by positioning a head of the mid-piece partially into a first recess of the first side piece and a second recess of the second side piece defining a pre-assembled arrangement of the locking spacer assembly;

placing the mid-piece, the first side piece, and the second side piece in the pre-assembled arrangement into the final spacer slot;

moving the first side piece and the second side piece away from the mid-piece;

engaging a fastener with the mid-piece;

rotating the fastener to engage with a surface of the disk groove;

further rotating the fastener to move the mid-piece away from the surface of the disk groove; and ceasing rotation of the fastener when the head of the mid-piece moves to a position where it is flush with a first outer surface of the first side piece and a second outer surface of the second side piece defining an assembled arrangement, wherein the first recess is formed in a first inner side surface and disposed completely inward of the first outer surface, wherein the second recess is formed in a second inner side surface and disposed completely inward of the second outer surface, wherein the first side piece comprises a first inner surface and a first groove that extends from the first inner surface to the first recess, wherein the second side piece comprises a second inner surface and a second groove that extends from the second inner surface to the second recess, wherein a mid-body of the mid-piece is disposed within the first groove and the second groove in the pre-assembled arrangement, and wherein the first inner surface and the second inner surface contact the base in the assembled arrangement.

9. The method of claim 8, further comprising engaging the mid-piece with the first side piece and the second side piece.

10. The method of claim 8, further comprising moving the first side piece and the second side piece in response to a movement of the mid-piece.

11. The method of claim 8, further comprising staking the fastener in the mid-piece with two staking dents defined on the head of the mid-piece.

* * * * *